W. J. DUNHAM.
HANDLE FOR LAWN ROLLERS AND THE LIKE.
APPLICATION FILED JAN. 6, 1910.
967,349.
Patented Aug. 16, 1910.
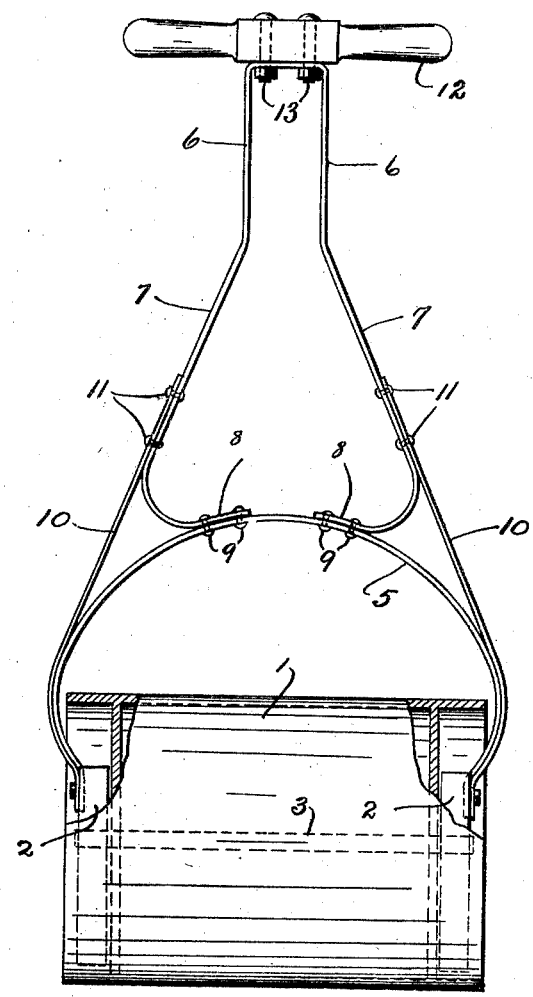
Witnesses:
Inventor:
Wiley J. Dunham
by Lynch Dores,
Attorneys.

UNITED STATES PATENT OFFICE.

WILEY J. DUNHAM, OF BEREA, OHIO, ASSIGNOR TO THE DUNHAM COMPANY, OF BEREA, OHIO, A CORPORATION OF OHIO.

HANDLE FOR LAWN-ROLLERS AND THE LIKE.

967,349.  Specification of Letters Patent.  Patented Aug. 16, 1910.

Application filed January 6, 1910. Serial No. 536,771.

*To all whom it may concern:*

Be it known that I, WILEY J. DUNHAM, a citizen of the United States of America, residing at Berea, in the county of Cuyahoga and State of Ohio, have invented certain new and useful Improvements in Handles for Lawn-Rollers and the Like; and I hereby declare the following to be a full, clear, and exact description of the invention, such as will enable others skilled in the art to which it pertains to make and use the same.

This invention relates to improvements in handles for manually propelled implements and particularly to handles for lawn rollers and the like.

The object of the invention is to provide a handle of the above indicated character that is light, durable, simple in construction and artistic in appearance.

My invention, therefore, consists in certain novel details of construction and combination and arrangement of parts hereinafter described in the specification, pointed out in the claims and illustrated in the accompanying drawing.

In the accompanying drawing I have shown a handle embodying my invention attached to the drum or roller of an ordinary lawn roller.

In general my handle comprises a lower member, an upper member which is rigidly secured to the lower member and a pair of side braces which are rigidly secured to both the upper and lower members. The lower member, indicated by 5, is bail-shaped and the ends thereof are operatively secured to the roller 1 in any suitable manner, and as shown in the drawings, the ends thereof are secured to a counterbalancing device 2 which is mounted on the axle 3 of the roller 1.

The upper member consists of a single flat bar which is bent at the center forming a U-shaped portion 6, the sides of which extend down straight for a short distance and then flare outwardly, as indicated at 7, and then are curved inwardly over the upper part of the bail portion, as at 8, and the ends thereof are secured to the bail portion by means of rivets 9. At each side of the upper member is secured one end of a brace bar 10 by rivets 11 which extends down to the bail portion 5 where it is curved similar to the bail portion and laps over the same and is secured thereto. A hand grip 12 is mounted on the upper member by means of bolts 13.

It will therefore be seen that I have provided a handle which while very simple and light in construction is quite strong and durable.

What I claim is,—

1. A handle for lawn rollers and the like, comprising a bail-shaped member, an upper portion formed of one piece, said upper portion being U-shaped at the top and having the sides flaring outwardly and downwardly and the lower ends extending inwardly over the top of said bail-shaped member and secured thereto, braces secured at their upper ends to said outwardly and downwardly flaring sides of the upper portion, said braces passing over the sides of said bail-shaped member and secured at their lower ends to said bail-shaped member and a hand grip secured to the top of said upper portion.

2. A handle for lawn rollers and the like comprising a bail-shaped member having its ends adapted to be secured to the roller, an upper portion formed of one piece, said upper portion being U-shaped at the top and having the sides flaring outwardly and downwardly and secured at their lower ends to the bail-shaped member and braces secured at their upper ends to the outwardly and downwardly flaring sides of said upper portion and extending down over the sides of said bail-shaped member and secured at their lower ends to said bail-shaped member, substantially as described.

In testimony whereof, I sign the foregoing specification, in the presence of two witnesses.

WILEY J. DUNHAM.

Witnesses:
J. R. DUNHAM,
A. P. STEPHENSON.